(No Model.) 5 Sheets—Sheet 1.

N. G. MOORE.
TYPE WRITING MACHINE.

No. 398,646. Patented Feb. 26, 1889.

Witnesses:
Lew. C. Curtis.
Frank Allison.

Inventor:
N. Grier Moore:
By Taylor E. Brown
his Attorney.

(No Model.) 5 Sheets—Sheet 2.
N. G. MOORE.
TYPE WRITING MACHINE.
No. 398,646. Patented Feb. 26, 1889.
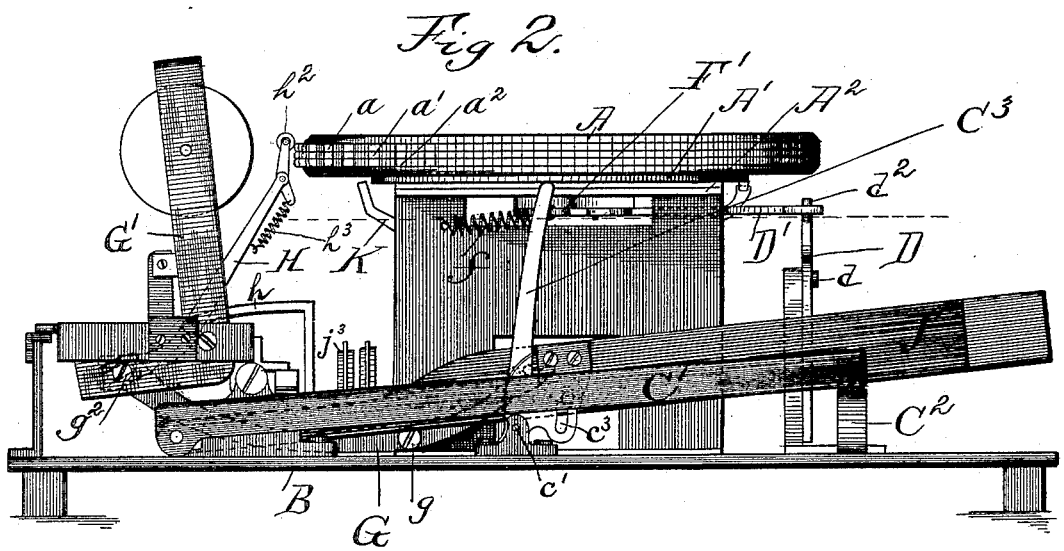
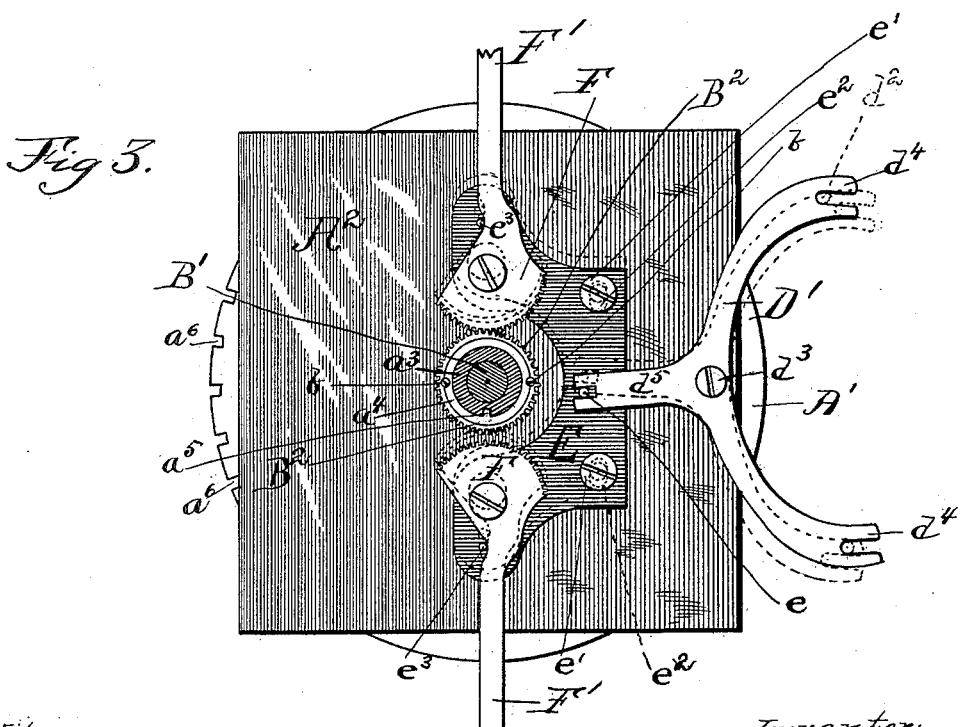

(No Model.) 5 Sheets—Sheet 3.
N. G. MOORE.
TYPE WRITING MACHINE.

No. 398,646. Patented Feb. 26, 1889.

Witnesses.
Geo. C. Curtis
Frank Allison

Inventor.
N. Grier Moore
By Taylor E. Brown
his Attorney.

(No Model.)  5 Sheets—Sheet 4.
N. G. MOORE.
TYPE WRITING MACHINE.
No. 398,646.  Patented Feb. 26, 1889.
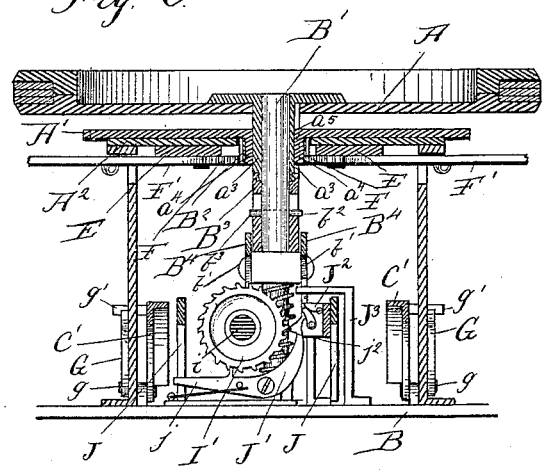
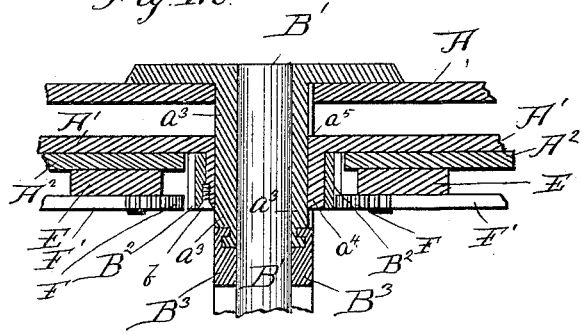
Witnesses:
Lew. C. Curtis.
Chas. Lawrie.
Inventor:
N. Grier Moore.
By Taylor E. Brown
his Attorney.
N. PETERS, Photo-Lithographer, Washington, D. C.

(No Model.)
N. G. MOORE.
TYPE WRITING MACHINE.
No. 398,646. Patented Feb. 26, 1889.
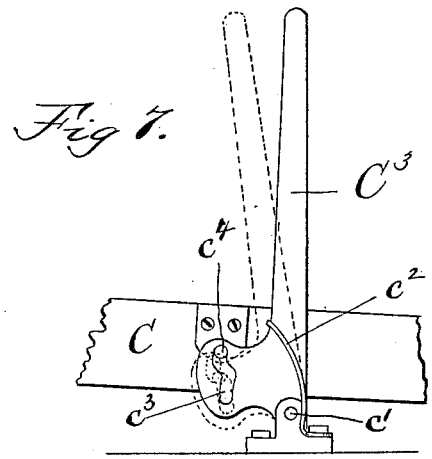
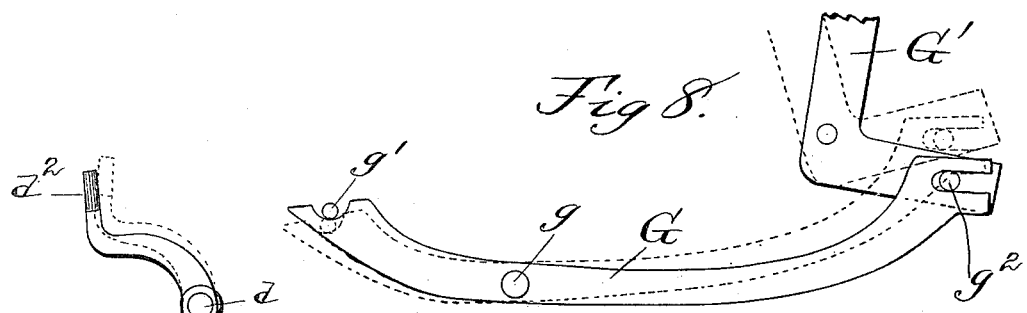
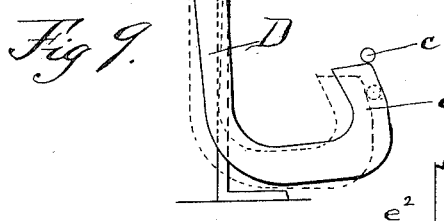
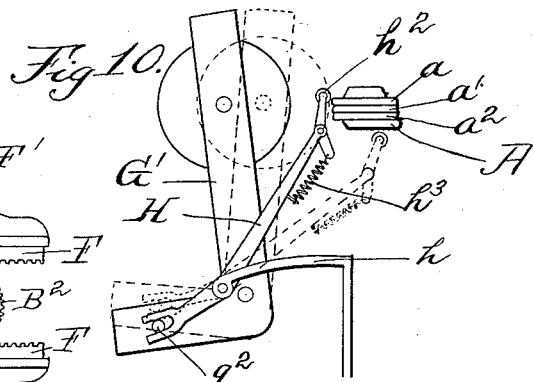
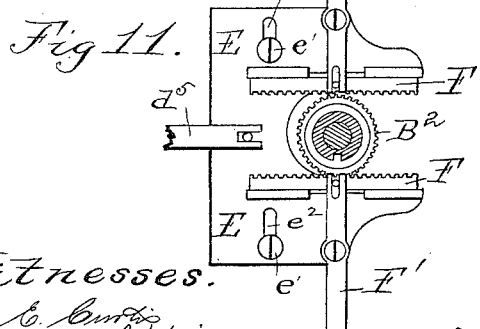
Witnesses.
Lew E. Curtis
Frank Allison
Inventor.
N. Grier Moore.
By Taylor E. Brown
his Attorney.

UNITED STATES PATENT OFFICE.

N. GRIER MOORE, OF CHICAGO, ILLINOIS.

TYPE-WRITING MACHINE.

SPECIFICATION forming part of Letters Patent No. 398,646, dated February 26, 1889.

Application filed September 14, 1887. Serial No. 249,720. (No model.)

*To all whom it may concern:*

Be it known that I, N. GRIER MOORE, a citizen of the United States, residing at Chicago, in the county of Cook and State of Illinois, have invented certain new and useful Improvements in Type-Writing Machines; and I do hereby declare the following to be such a full, clear, and exact description of the invention as will enable others skilled in the art to which it appertains to make and use the same.

This invention relates, principally, to that class of type-writing machines in which the type or letters are secured to the periphery of a rotating disk or segment, and the paper or paper-roller is caused by a movement of a lever to oscillate and impinge against said type, as illustrated in my former United States Letters Patent, No. 357,090; but, so far as applicable, my invention is intended to be used and become part of all classes of type-writers.

The invention consists in the novel devices and combination of devices hereinafter described, and pointed out more specifically in the claims, reference being had to the accompanying drawings, forming a part of this specification, and in which similar letters of reference indicate like parts throughout.

Figure 1:
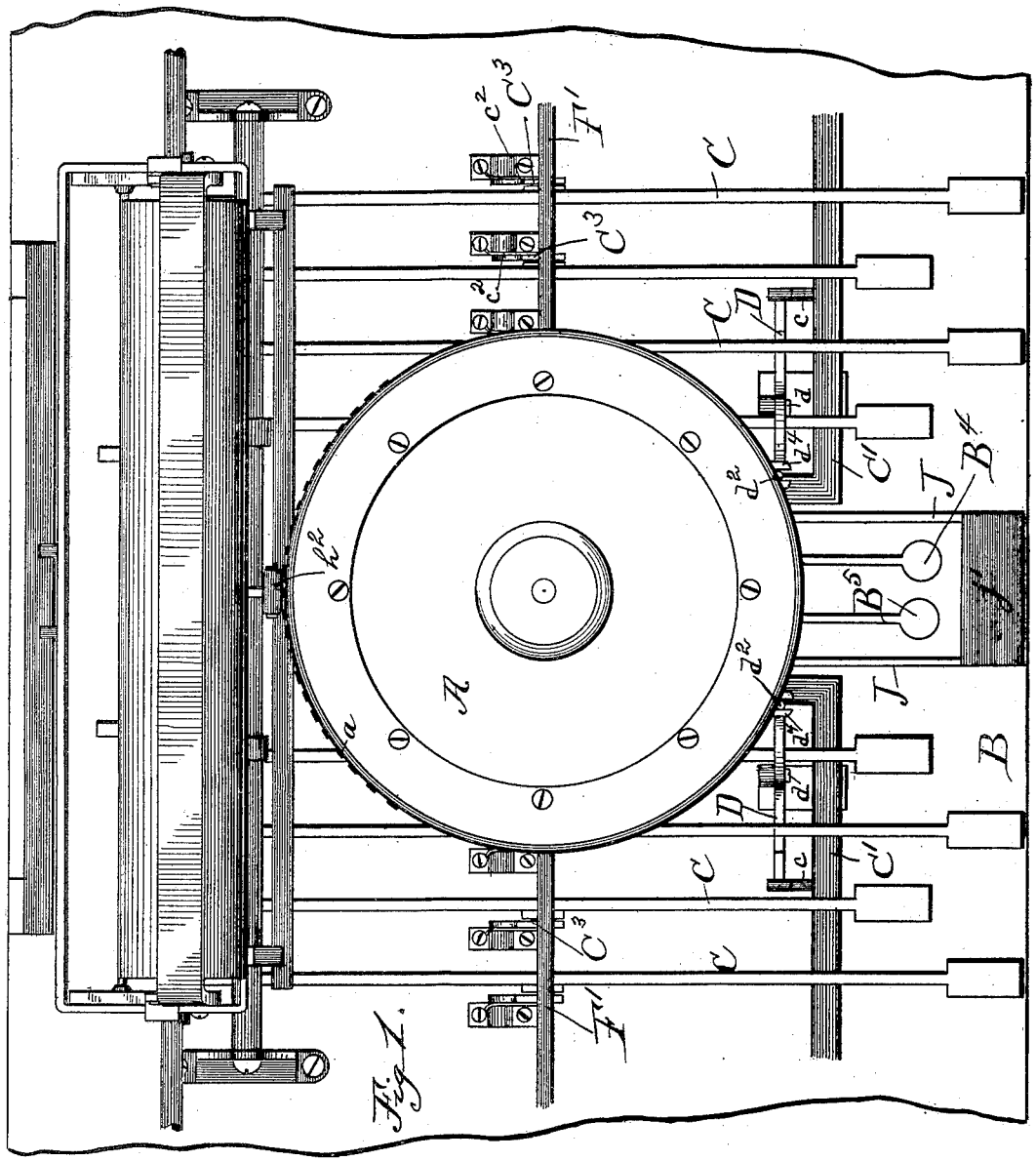
Figure 4:
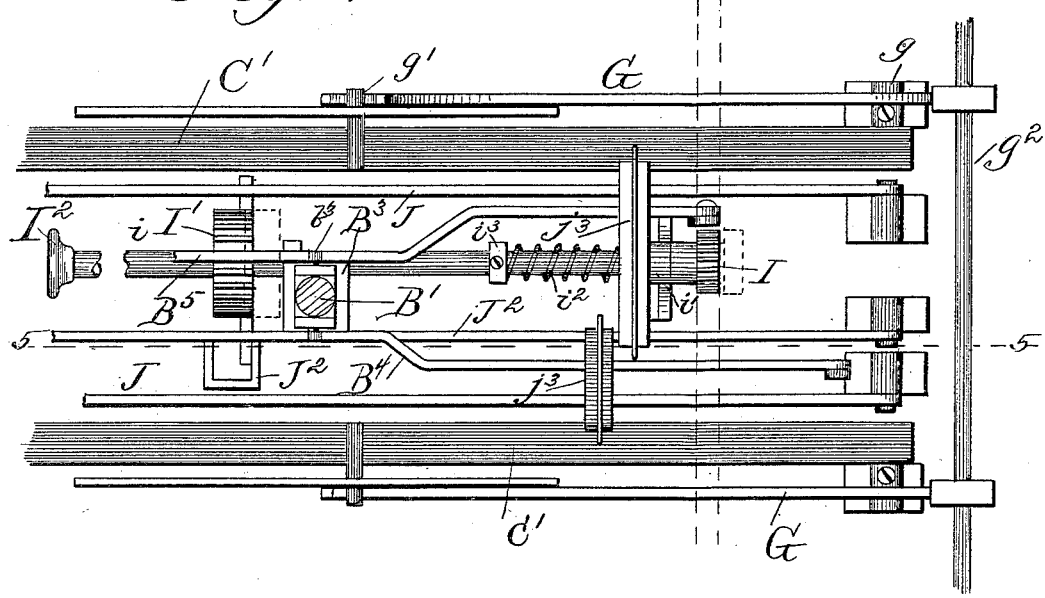
Figure 5:
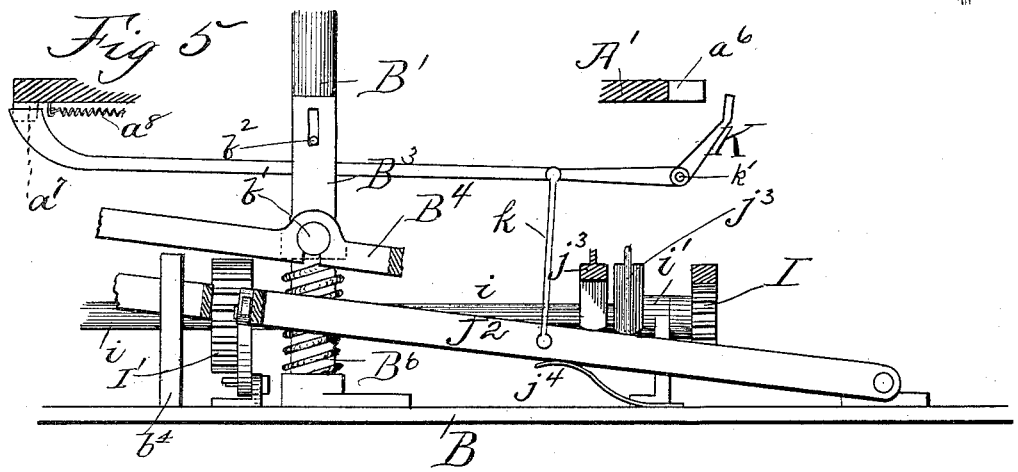

In said drawings I have illustrated in Figure 1, in a plan view, a device embodying my invention, and in Fig. 2 a side elevation of the same. Fig. 3 is a plan view of the under side of the disk-moving mechanism. Fig. 4 is a plan view below the disk, and Fig. 5 is a partial sectional view taken on line 5 5 of Fig. 4, looking toward the shaft. Fig. 6 is a vertical sectional view at right angles to the view illustrated in Fig. 5. Figs. 7, 8, and 9 are vertical side detail views of the parts hereinafter mentioned. Fig. 10 is a side view of the inking device, and Fig. 11 is a modification of the disk-moving mechanism. Fig. 12 is an enlarged sectional detail view of a portion of the type-disk-operating device.

In this invention, as illustrated in said drawings, the type are secured to a disk or segment, preferably three tiers deep, one above the other; but single or double tiers may be equally well used. The paper-carrying roller, mounted on a traveling carriage, is caused to impinge against the type by the action of keys, a portion being placed on each side of and beneath the type-disk. By being connected with the levers and other mechanism shown these lever-keys cause the type disk or segment to rotate as desired to present the proper type to be printed. The same movement causes a locking-lever to engage and lock the type-disk during the printing, while the oscillating movement of the paper-carrying roll moves the ink-roller across the face of the type and then out of the way of the paper. Separate keys are used to present the upper and middle tiers of type to the printing-point, the lower tier being in position when the machine is at rest. I have not illustrated any device for holding the paper on the roll or for revolving the roll, as the same forms no part of the present invention. Any of the devices now in use for this purpose may be used with my new invention— as, for example, that shown in my said Letters Patent, No. 357,090.

The letter A represents the type-disk, (which may as well be a segment amounting to a third or more of the circumference of the circle,) the letter $a$ the upper, $a'$ the middle, and $a^2$ the lower, tier or set of types secured to the periphery of said disk or segment; $A'$, the locking-disk, and $A^2$ the elevated platform, upon which the disk $A'$ rests.

B is the main table of the machine. Secured to and rising vertically from this table B is the non-rotating shaft $B'$. Surrounding the upper end of this shaft, and integral with the type-disk A, is the vertically-depending hub or collar $a^3$, which extends down through the locking-disk $A'$, the platform $A^2$, and into a similar but shorter hub or collar, $a^4$, depending from the locking-disk $A'$. Surrounding the lower end of this hub or collar $a^4$, and immediately beneath the platform $A^2$, is the cog-wheel or pinion $B^2$, secured to said hub by the screws $b\ b$. A key or feather, $a^5$, on the inside of the hub $a^4$ fits into a groove in the periphery of the collar $a^3$, thus locking the type-disk and the locking-disk together, as shown.

The keys C are pivoted to the main table B and extend (preferably in an inclined position) toward the front of the machine, as illustrated in Fig. 7, the free ends resting on pivoted frames $C'\ C'$. These frames, one on each side of the shaft B', are maintained in an inclined raised position by springs $C^2 C^2$, which may be located at any convenient point along and under the frame. Pivoted at $d$, on either side of the machine, are the bent cam-levers D, as illustrated in Fig. 9. A pin, $c$, on the frame C' engages the cam $d'$ of this lever D, and by the first part of its downward stroke brings the lever D into the position shown in dotted lines in said figure, and during the remainder of the stroke the pin $c$ slides along the vertical surface of the cam $d'$. The points $d^2$ of these levers D engage the bifurcated ends $d^4$ of the shifting-lever D', which latter is pivoted at $d^3$ to the under side of the platform $A^2$, and has a central arm, $d^5$, with slotted end to engage the pin $e$ of the yoke-plate E. This plate E is movably secured to the under side of the platform $A^2$ by screws $e'$, passing through the elongated slots or openings $e^2$. (Shown in dotted lines in Fig. 3.) Upon each arm of the plate E is secured pivotally the segment F, arranged as illustrated, to alternately engage the pinion or cog-wheel $B^2$, as desired—that is to say, the right-hand segment F is geared to the cog-wheel $B^2$ when a key-lever C, located on the right hand of the machine, is depressed by the operator, and it is released and the left-hand segment F similarly geared when a left-hand key-lever C is depressed. A stop, $e^3$, on the plate E serves to limit the movement of the segments F to the proper amount of throw.

Each segment F is integral with a lever, F', as shown. These levers extend out horizontally on either side of the type-disks, and are each engaged by a series of vertical levers, $C^3$, which rise from the main table and are connected with the different character-keys C, as clearly shown in Figs. 1, 2, and 7. Being pivoted at $c'$, the levers $C^3$ are preferably retained in position illustrated in full lines in Fig. 7 by the wire spring $c^2$, which, however, may be entirely omitted, if desired. In the foot or short arm of the lever $C^3$ is the cam-slot $c^3$, in which the pin $c^4$, secured to the key-lever C, works, and which, by the movement of the key-lever, moves the lever $C^3$ into the position illustrated in dotted lines in said Fig. 7. These levers $C^3$ are so positioned on the table with reference to each other, the type-characters on the type-disk, and the levers F' that as the levers $C^3$ are moved by the key-levers the levers F' will move a greater or less distance, according as the levers $C^3$ are farther from or closer to the shaft B', thereby causing the segments F to rotate the pinion $B^2$ the proper distance in presenting the desired type to the proper position for printing. The cam-slot $c^3$ is extended upward, so that the key-levers C may descend with the frame C', and by the pressure of the pin $c$ on the cam $d'$ shifts the geared segment F into engagement with the cog-wheel $B^2$ on the same side with the key thus depressed simultaneously, and by the same motion disengaging the other segment. Thus when the lever $C^3$ begins to bear against the lever F' the type-disk is connected therewith and turns accordingly.

Pivoted at $g$ is the vertically-tilting lever G, its short arm being engaged and operated by a pin, $g'$, on the frame C', and its long arm engaging and operating the rod $g^2$ of the printing-roll frame G', as more clearly shown in Fig. 8. A lever, H, supported from the frame by the bracket $h$, is operated by the rod $q^2$ of the printing-roll frame G', as shown in Fig. 10. To the other end of this lever H is pivoted a short lever, one end of which carries an ink-roller, $h^2$, of any ordinary construction, and the other end being connected to the lever H by a spring, $h^3$, as shown, so that the tilting movement of the paper or paper-carrying roller toward the type-disk causes the ink-roller to move vertically across the face of the type, inking them, and then moves below the disk out of the way of the stroke of the paper-roll, as more clearly shown in Fig. 10.

The paper-roll is mounted upon a traveling carriage of any well-known form, but preferably that form shown in my said former patent and herein, and is operated by a pinion, I, which engages a rack secured beneath or integral with the carriage. This pinion I is mounted on the end of the shaft $i$, which in turn is so secured in journals $i'$ as to permit a longitudinal as well as a rotary movement of the shaft. The shaft is provided near its other end with a pinion, I', and upon the end with a push-button, $I^2$. Surrounding the shaft $i$ is the spring $i^2$, one end of which presses against the journal $i'$ and the other end against the collar $i^3$ on the shaft $i$, thus keeping the pinion I in the position shown in full lines in Fig. 4. To return the carriage, at the end of the printed line, the operator, by pushing upon the button $I^2$, presses the pinion I out of gear, and the carriage is then returned easily. To move the carriage a "space," or the width of a type at each stroke of one of the type or character levers or of the spacing-lever J, I make use of the escape-pawl J', (illustrated in Fig. 6,) which is practically the same in operation as the device illustrated in my said former patent. The long arm $j$ of this pawl J' is operated by the spacing-lever J by pressure exerted at $j'$, while the short arm $j^2$ is operated by the lever $J^2$ from either of the key-frames C', the frames being connected to the lever $J^2$ by bridges $j^3$, as illustrated.

It is understood, of course, that whatever paper-carrying device is used with this invention a spring or other tension device will be employed in any of the well-known methods to cause said paper-carrying device to move toward the left-hand side of the machine as soon as the escape-pawl J' is operated, as described.

Pivoted at $k'$ to the support of the elevated platform $A^2$ is the bent lever K, the short end when moved entering one of the slots $a^6$ in the periphery of the locking-disk A', the other end in its turn engaging the lug $a^7$ on the opposite side and underneath said disk. A link, $k$, connects the lever K with the spacing-lever $J^2$, so that when the spacing-lever is depressed the lever K is engaging the disk at $a^6$ and prevents said disk from rotating until the lever $J^2$ is released.

The shaft B' is surrounded by a sliding collar, $B^3$, bearing a pin or stud, $b'$, on each side. The levers $B^4$ and $B^5$, pivoted in the rear of the machine, as shown, extend one on each side of the shaft B' to the front, each engaging the pin $b'$. The lower end of the collar $a^3$ of the type-disk A rests upon and is firmly united to the uppermost part of the collar $B^3$ by screws or other convenient means. When it is desired to lower the type-disk to present one or more type-characters contained in the upper tiers of types, the lever $B^4$ is depressed and held by one hand while the operator strikes the required key-lever with the other hand.

The spring $B^6$, surrounding the lower end of the shaft B', presses against the under side of the collar $B^3$ and keeps it in position shown in Figs. 5 and 6, the upward movement of the collar being limited by the pins $b^2 b^3$, which are secured to the shaft B' and project through slots in the collar $B^3$. When the middle tier of types is to be used, the disk is lowered to position by depressing the lever $B^4$ until arrested by the stop $b^4$. The upper tier of types is lowered in position by depressing the lever $B^5$ until the stop-pin $b^3$ engages the top of the slot in the collar $B^3$ through which said pin projects.

The levers $B^4$ and $B^5$ are pivoted at unequal distances behind the shaft B', as shown in Fig. 4, the point of pivoting being so located, compared with each other and in reference to the shaft B', that the same stroke on the free end of each will lower the type-disk, so that in the one case the upper tier, and in the other case the middle tier, of characters will be positioned for printing.

While the feather $a^5$ secures the type and locking-disks together, so that they will be rotated together by the pinion $B^2$, yet the fitting of the collar $a^3$ within the locking-disk collar $a^4$ should be such as to permit of a free vertical movement thereof within the locking-disk and upon the shaft. The length of the collar $a^3$ of the type-disk below the pinion $B^2$ should be such that when the type-disk is at its highest position the collar $B^3$ will not touch the pinion. The spacing-levers J J are maintained in position by suitable springs, and the lever $J^2$ by spring $j^4$, as shown.

The springs $f$, one on each side of the support of the platform $A^2$, maintain a tension on the levers F' and draw them back against the levers $C^3$ after each stroke.

The weight of the paper-carrying roller and its mechanism will generally be sufficient to return it to its position without a spring; but a suitable spring may be placed under the short arms of the tilting levers G, which in such case may and preferably should be coupled together and used as one. This spring may be of sufficient strength to dispense with the spring $C^2$ under the frames C'. Light wire springs should be placed under each key C, sufficient to support it.

In the modification illustrated in Fig. 11 the lever F' is provided with or operates a sliding rack, F, movably secured upon the plate E. Instead of the gear-pinion $B^2$ and rack or segment F, any milled or roughened surface may be substituted therefor which will when in contact turn without slipping.

Lost motion in the lever F', caused by loose gearing in pinion $B^2$ and segment or rack F, may be compensated by extending the cam-levers $C^3$ so as to make a longer stroke.

Having now described my invention, what I claim, and desire to secure by Letters Patent, is as follows:

1. In a type-writing machine, the combination of the type-disk A, movably secured to the non-rotating shaft B' by the hub $a^3$, the shaft B', the vertically-sliding collar $B^3$ thereon, with levers $B^4$ and $B^5$ and stops $b^3$ and $b^4$, substantially as described, to present the different tiers of type on the type disk or segment to the printing-point.

2. In a type-writing machine, the combination of the spacing-lever J, pawl J', the shaft $i$, the pinions I and I', mounted thereon, and the spring $i^2$ with a traveling paper-carrying carriage, substantially as and for the purpose specified.

3. In a type-writing machine, the paper-carrying carriage, in combination with the pinions I I' and spring $i^2$, mounted on the shaft $i$, the shaft $i$, the pawl J', the lever $J^2$, the bridges $j^3 j^3$, and the frames C' C', arranged and operated substantially as described.

4. In a type-writing machine, the rotating type disk or segment A, the disk A', movably secured thereto by the collar $a^3$, with the levers $J^2$ and K, said disk A' having slots $a^6$, to engage one end of said lever K, and being provided also with a stop, $a^7$, to engage the other end of said lever, substantially as and for the purpose described.

5. In a type-writing machine, the combination of the pinion $B^2$, the segments or racks F F, the plate E, the yoke D', with the levers D D, and the key-frames C' C', substantially as and for the purpose specified.

6. In a type-writer, the combination of the plate E, a pair of horizontal levers, F' F', secured thereto, each having a long and a short arm, the pinion $B^2$, connected to a type disk or segment, with means, substantially as described, for shifting said plate E so as to engage the short arms of said levers F' F' with the pinion $B^2$ alternately or at will, substantially as specified.

7. In a type-writer, the combination of the key-levers C C, vertical levers $C^3 C^3$, each connected, substantially as described, with its respective key-lever, and the pivoted levers F' F', each having a long and a short arm, said levers $C^3$ being so disposed along the long arms of the pivoted levers F′ F′ that the equal horizontal motion of each lever C³ by its key-lever C will move the short arm of said lever F′ (to wit, the segment F) a distance greater or less as said key-lever C is nearer or farther from the fulcrum of said lever F′, substantially as specified.

8. In a type-writing machine where the impressions are made by an oscillating paper roll or hammer, the combination of a series of key-levers, C C, with the frames C′ C′, the tilting lever G, the rod $g^2$, and a paper-carrying roll or hammer, substantially as specified.

N. GRIER MOORE.

Witnesses:
TAYLOR E. BROWN,
THEO. SMITH.